H. ROCHMILL.
LEMON SQUEEZER.
APPLICATION FILED DEC. 2, 1913.
1,136,837.
Patented Apr. 20, 1915.
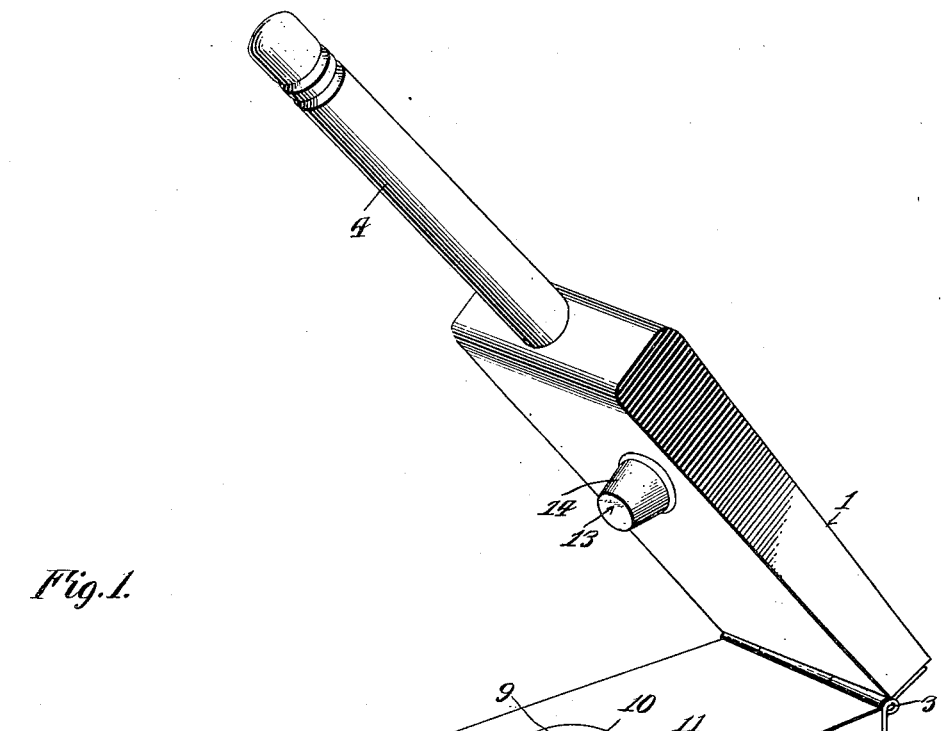
Fig. 1.
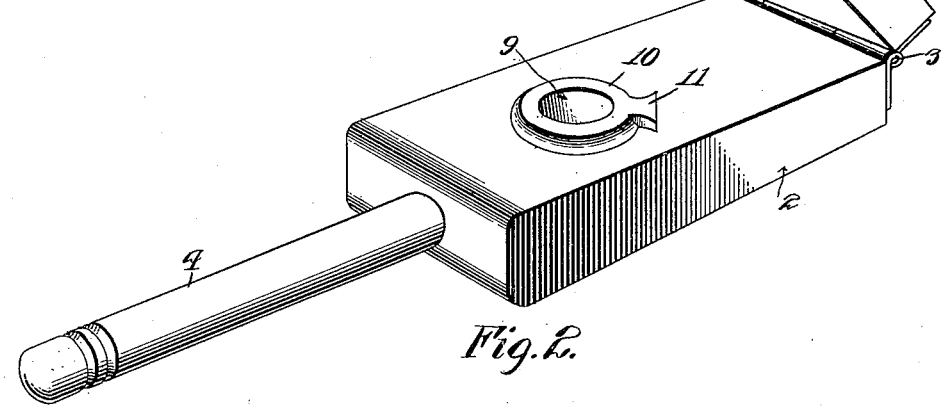
Fig. 2.
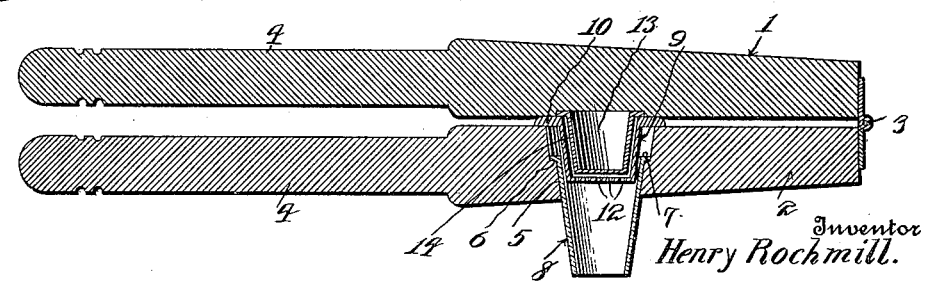
Inventor
Henry Rochmill.
Witnesses
P. H. Taylor
By Victor J. Evans
Attorney

UNITED STATES PATENT OFFICE.

HENRY ROCHMILL, OF SELMA, ALABAMA.

LEMON-SQUEEZER.

1,136,837.     Specification of Letters Patent.     Patented Apr. 20, 1915.

Application filed December 2, 1913. Serial No. 804,267.

*To all whom it may concern:*

Be it known that I, HENRY ROCHMILL, a citizen of the United States, residing at Selma, in the county of Dallas and State of Alabama, have invented new and useful Improvements in Lemon-Squeezers, of which the following is a specification.

This invention relates to expressing devices and more particularly to lemon squeezers.

The principal object of the invention is the provision of a simple and efficient device of this character which is simple to manufacture and, therefore, cheaply produced and in which all of the parts exposed to the juice of the fruit may be conveniently cleansed.

Further objects of the invention will appear as the following description is read in connection with the accompanying drawing, which forms a part of this application, and in which:—

Figure 1 is a perspective view. Fig. 2 is a longitudinal sectional view.

Referring more particularly to the drawing, 1 and 2 represent the separate shanks which are connected at one end by the hinge 3. The opposite ends are provided with handles 4 which when brought together act to squeeze the fruit, as will be more clearly understood hereinafter. Both shanks 1 and 2 are preferably constructed of hard wood and the latter is supplied with a through aperture 5 having inclined walls and a shoulder 6. Seated in the smaller portion of the aperture 5 and having a flange 7 at its upper end resting upon the shoulder 6 is a drain tube or spout 8 which has its walls tapered to fit the tapering walls of the aperture 5 and which is open at the bottom to prevent the free passage of the juice into any type of retainer. Seated within the upper edge of the tube 8 is a cup 9 which is supported on the shank 2 by a lateral flange 10 having a finger piece or extension 11 by which the same may be manipulated. The walls of this cup depend and fit within the tube 8, being tapered to accomplish this purpose and the bottom of the cup is provided with a plurality of perforations indicated at 12, these being the only openings in the cup which permit of the escape of the juice of the fruit.

The member 1 has attached thereto a pressure head 13 provided with tapering side walls 14 to substantially fit the walls of the cup 9. This pressure head is shown in Fig. 2 and is preferably constructed of aluminum as is the cup 9, while the tube or spout 8 is preferably constructed of glass or some similar material which will not corrode from the effects of the acid.

It will be noticed that both the cup and the drain spout or tube can be readily removed from the aperture 5 so that the walls of the aperture 5 may be cleaned if necessary and the cup and spout properly sterilized or otherwise similarly treated when necessary. The head 13 is preferably rigidly secured to the part 1 but has its outer face freely exposed so that it can be conveniently cleansed.

In practice, half of the fruit is placed upside down in the cup and the handle members brought together. The juice from the fruit cannot rise above the cup and it, therefore, passes out through the openings 12 below the top rim of the drain spout or tube 8.

What is claimed is:—

A lemon squeezer comprising an upper shank and a lower shank hinged together at one end, the upper shank being provided with a circular depression, a hollow pressure head having its marginal edge flanged and seated in said depression, said lower shank having a through bore of different diameters, a spout seated therein, said spout having a portion of its outer surface contacting with the lower portion of the bore and its upper edge flange and seat on the shoulder formed in the wall of the bore, and a flanged cup extending into said spout inclosing the upper end of the bore, said head, cup and spout being tapered longitudinally so that their surfaces will lie in close proximity to each other.

In testimony whereof I affix my signature in presence of two witnesses.

HENRY ROCHMILL.

Witnesses:
P. FAGAN,
LESLIE LILIENTHAL.

Copies of this patent may be obtained for five cents each, by addressing the "Commissioner of Patents, Washington, D. C."